UNITED STATES PATENT OFFICE 2,680,089

BARIUM SULFATE SUSPENSION

Benno Lowy, San Francisco, Calif.

No Drawing. Application February 13, 1950,
Serial No. 144,046

1 Claim. (Cl. 167—95)

The invention, in general, relates to the science of physiology and more particularly relates to radiology as applied to the human body affording improved means for quickly and more readily identifying a disease status in human organs, or other portions of the body.

Heretofore, there has been but little attention devoted to improved materials for effecting X-ray or fluorescence films of the human organs; the medical profession relying, in the main, upon an aqueous suspension of barium sulfate for radiological work. The various suspensions heretofore used normally require the taking of from four to six different films largely because of the lack of clarity thereof and, as a result, a patient must be confined in the hospital for nearly a full day. The present invention is directed to the provision of an improved barium sulfate suspension which obviates inherent disadvantages of prior suspensions of this character and which is highly effective for the stated purposes.

A primary object of the present invention is to provide an improved barium sulfate suspension for use in the field of radiology which affords higher and clearer radiological visibility.

Another important object of my invention is to provide an improved barium sulfate suspension of the indicated nature which is additionally characterized by its stability and its tendency to remain in a desirable consistency for effective periods of time whereby clearer films are afforded in much less time.

A still further object of my present invention is to provide an improved barium sulfate suspension of the aforementioned character which does not contribute to the development of any intestinal obstructions while in the body but which has the property of providing a smooth film-like coating for inner lining not only for the large intestines but for the small gastro-intestinal tracts.

Other objects of the invention, together with some of the advantageous features thereof, will appear from the following description of a preferred compound as well as a preferred mode of preparation thereof. It is to be understood, however, that I am not to be limited to the precise formula of the compound as set forth, nor to the precise order of steps of preparation thereof, as my invention, as defined in the appended claim, can be embodied in a plurality and variety of forms and can be prepared in a variety and plurality of ways.

In its preferred form, the improved compound of the present invention preferably comprises a barium sulfate suspension containing a physiologically inert stabilizer consisting of a solution of a water-soluble cellulose ether, and also containing a suitable penetrant of cationic origin for enhancing the workability of the compound.

In accordance with the invention, I initially prepare the effective stabilizer for the compound by heating a predetermined amount of water to boiling temperature and then sift into the boiling water a predetermined quantity of the stabilizer. In the present embodiment of the invention, I preferably employ carboxymethylcellulose, a white granular tasteless powder which hereinafter will be referred to, for brevity, as CMC, as the stabilizing agent for my improved barium sulfate suspension. The amount of this powder used is such as to provide a 0.75% concentration of CMC and may be described as a water-soluble cellulose ether.

The CMC solution thus obtained may be stated in chemical formulae as follows:

$$R-O.CH_2COONa$$

or $$R-O.CH_2COOK$$

or $$R-O.CH_2COONH_3$$

where R represents the cellulose structure. These CMC solutions are physiologically inert, are very compatible with hydrophillic colloids affording excellent suspending and film forming qualities with barium sulfate, and have a viscosity which is at a maximum where the pH value of the solution is approximately 6, the preferable pH value of the stabilizer.

During the preparation of the aforementioned CMC solution and while still warm, I add a suitable penetrant for improving the working quality of the finished compound. The penetrant which I have found to be highly effective is a sulfonated salt of a higher fatty acid, namely lauryl sulfoacetate which is commercially available under the trade-mark "Nacconol L. A. L."; such penetrant having proven capable of effectively carrying the viscous suspension into capillary tissues far better than ordinary water suspensions of barium sulfate.

In accordance with the present improvement a suspension of barium sulfate is then prepared in the conventional manner utilizing either a colloidal mill or a colloidal homogenizer, and the suspension then incorporated into the liquid phase of the stabilizer prepared as hereinabove described. In order to make the finished product more acceptable for gastric use, a small amount of a masking flavor, such as chocolate, is added together with a sweetening agent, such as saccharine. A typical formulation of my improved compound consists of:

Per gallon of finished compound—

| | |
|---|---|
| Carboxymethylcellulose, heavy type grams__ | 28 |
| Nacconol L. A. L_____do____ | 1 |
| Saccharine_____do____ | 0.5 |
| Flavor _____cc__ | 5 |
| Barium sulfate_____grams__ | 1500 |

It may be observed that the concentration of the CMC solution can be varied to balance the weight of the suspended barium sulfate in the compound against a viscosity which may be desired for particular work, say, for gastric use or colonic application. In this connection, it is probably well known that carboxymethylcellulose is manufactured in several different classifications which denote variation in viscosity per given concentration in water. The heavy type was found to be best balanced as to the formulation set out above.

The herein described improved barium sulfate suspension containing the aforesaid stabilizer has been primarily devised for use in radiological work in the examination of various portions of the human body and may be introduced orally or rectally using a tube. In gastric use, my stabilized barium sulfate suspension will reach the ileo-seocum in approximately two hours and the distal colon in about four hours; and it will demonstrate the gastro-intestinal tract in unsurpassed radiographic clarity because of its properties of providing a smooth film-like coating or inner-lining of the mucosa.

My improved compound has been found more effective than ordinary aqueous suspension of barium sulfate since it keeps the barium in suspension for appreciably longer periods and it settles out slowly. Aqueous suspensions of barium sulfate heretofore used do not pass through the intestines for 22 to 24 hours whereas the passage time for my compound is approximately 2 hours. Moreover, with ordinary aqueous suspension of barium sulfate, a patient is under examination for approximately 6 hours with examinations at ½ hour intervals whereas with my compound the entire examination can be completed in approximately 1 hour. Heretofore, using 14" to 17" films, radiological work with ordinary aqueous suspensions of barium sulfate requires 6 films, whether by X-ray or fluoroscopically, while with my compound the examination can be completed with from 1 to 2 films because of resulting clearer radiological visibility.

It may also be observed that the presence of the hereinabove described stabilizer prevents both agglutination and molecular dispersion, and my compound retains its liquid consistency far better than prior barium sulfate suspensions, it does not tend to dry, nor does it contribute to the development of intestinal obstructions thus aiding rather than interfering with its expulsion.

It is to be understood that the appended claim is to be accorded a range of equivalents commensurate in scope with the advance made over the prior art.

I claim:

A compound for gastric and colonic radiological work, said compound comprising a barium sulfate colloidal suspension, containing a physiologically inert stabilizer consisting of a 0.75 per cent concentration of carboxymethylcellulose having a pH value of 6, and also containing a penetrant consisting of lauryl sulfo-acetate.

References Cited in the file of this patent

UNITED STATES PATENTS

| Number | Name | Date |
|---|---|---|
| 2,348,231 | Strain | May 9, 1944 |

FOREIGN PATENTS

| Number | Country | Date |
|---|---|---|
| 517,425 | Britain | Jan. 30, 1940 |
| 109,611 | Sweden | Nov. 25, 1943 |

OTHER REFERENCES

Elliott—Pharmaceutical Journ., Vol. 148, page 141 (Apr. 18, 1942).

Davies—Soap, Perfumery and Cosmestics, May 1948, pgs. 684, 686.

Bull. of the Nat'l. Formulary Committee, Aug.-Sept. 1942, Vol. X, page 203.

Jour. Amer. Med. Assn., May 5, 1951, page 62.